United States Patent
Arima

(10) Patent No.: US 8,505,971 B2
(45) Date of Patent: Aug. 13, 2013

(54) KNEE BOLSTER FOR VEHICLE

(75) Inventor: Tetsuhiro Arima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/370,578

(22) Filed: Feb. 10, 2012

(65) Prior Publication Data
US 2012/0228856 A1 Sep. 13, 2012

(30) Foreign Application Priority Data

Mar. 7, 2011 (JP) ................................ 2011-049620

(51) Int. Cl.
*B60R 21/045* (2006.01)
*B60R 21/206* (2011.01)

(52) U.S. Cl.
USPC ........... 280/752; 280/748; 280/751; 280/753; 296/187.05; 188/371

(58) Field of Classification Search
USPC .................... 280/748, 751–753; 296/187.03, 296/187.05; 188/371
See application file for complete search history.

(56) References Cited

U.S. PATENT DOCUMENTS

| 5,518,270 A * | 5/1996 | Hanada et al. ............... 280/751 |
| 5,951,045 A * | 9/1999 | Almefelt et al. .............. 280/748 |
| 6,170,872 B1 * | 1/2001 | Bair et al. ..................... 280/751 |
| 7,832,764 B2 * | 11/2010 | Kawashima et al. ......... 280/751 |
| 2007/0222197 A1 * | 9/2007 | Makita et al. ................ 280/752 |
| 2011/0018247 A1 * | 1/2011 | Misikir et al. ............... 280/751 |

FOREIGN PATENT DOCUMENTS

| JP | 06-183307 | 7/1994 |
| JP | 2000-038101 | 2/2000 |
| JP | 2000-043661 | 2/2000 |
| JP | 2002-326550 | 11/2002 |
| JP | 2006-151087 | 6/2006 |
| JP | 2006-341808 | 12/2006 |
| JP | 2007-284034 | 11/2007 |
| JP | 2010132116 A * | 6/2010 |

OTHER PUBLICATIONS

Japanese Office Action and English translation, JP Application No. 2011-049620, Mailed Mar. 26, 2013, seven pages.

* cited by examiner

*Primary Examiner* — Ruth Ilan
*Assistant Examiner* — Darlene P Condra
(74) *Attorney, Agent, or Firm* — Rankin, Hill & Clark LLP

(57) ABSTRACT

A present invention provides a knee bolster for a vehicle including a first bracket with a first support portion, a first load receiving portion, and a first deformation portion, and a second bracket with a second support portion, a second load receiving portion, and a second deformation portion, wherein the second bracket is arranged such that the distance between the second load receiving portion and the knee is shorter than the distance between the first load receiving portion and the knee in the load application direction.

8 Claims, 6 Drawing Sheets

FRONT ← → REAR

KNEE BOLSTER FOR VEHICLE

BACK GROUND OF THE INVENTION

The present invention relates to a knee bolster for a vehicle.

Priority is claimed on Japanese Patent Application No. 2011-049620, filed Mar. 7, 2011, the contents of which are incorporated herein by reference.

FIELD OF THE INVENTION

Knee bolsters including a first arm which promotes deformation during the collision and a second arm connected to the first arm are known. For example, Japanese Unexamined Patent Application, First Publication No. 2007-284034 discloses a knee bolster in which a first arm and a second arm connect an arm guide mounted on a steering member and a plate to which a load from a knee is applied during the collision. In this knee bolster, tip ends of the first arm and the second arm are arranged in parallel along the direction perpendicular to the load application direction and are connected to the plate. That is, the tip ends of the first arm and the second arm are arranged along a surface of the plate.

According to this structure, when the knee of the occupant strikes on the plate, the load is simultaneously applied to the first arm and the second arm via the plate.

DESCRIPTION OF THE RELATED ART

Meanwhile, the load applied to the knee bolster may become large or small depending on the usage or non-usage of a seat belt by the occupant, the velocity of the vehicle at the time of the collision, and the like. In the related art, the amount of the impact absorption is designed to absorb only a large load. More specifically, the knee bolster is made from a member having a relatively high rigidity so as not to immediately reach the end of the deformation stroke when high impact force is applied to the knee bolster, thereby stably protecting the knee of the occupant.

However, this related art does not expect a case where a relatively small load is applied to the knee bolster. Accordingly, when the impact force does not reach the Force needed to deform the knee bolster, the knee bolster will not be deformed. As a result, the load applied to the knee of the occupant will increase.

An object of the present invention is to provide a knee bolster for a vehicle capable of suitably absorbing impact to the knee of the occupant in accordance with the amount of the applied load.

SUMMARY OF THE INVENTION

The present invention employs the following configurations for solving the above problem.

(1) A first aspect of the present invention is a knee bolster for a vehicle, the knee bolster being adapted to be deformed when a load is applied from a knee of an occupant in a load application direction so as to absorb an impact to the knee, the knee bolster having, a first bracket which includes: a first support portion which is supported by a vehicle body member and extends toward the knee; a first load receiving portion which extends from an extended tip end of the first support portion in a direction which crosses the load application direction; and a first deformation portion which is arranged between the first support portion and the first load receiving portion, and is adapted to be deformed when the load is applied, and a second bracket which includes: a second support portion which is supported by the vehicle body member or the first bracket and extends along the first support portion; a second load receiving portion which extends along the first load receiving portion; and a second deformation portion which is arranged between the second support portion and the second load receiving portion, and is adapted to be deformed when the load is applied; wherein the second bracket is arranged such that the distance between the second load receiving portion and the knee is shorter than the distance between the first load receiving portion and the knee, in the load application direction.

(2) In the knee bolster for a vehicle according to (1), the first bracket may include a first tip end portion at an opposite side of the first deformation portion with respect to the first load receiving portion; and the second bracket may include a second tip end portion at an opposite side of the second deformation portion with respect to the second load receiving portion, and the second tip end portion may be arranged such that a distance between the second tip end portion and the knee is shorter than a distance between the first tip end portion and the knee, in the load application direction.

(3) In the knee bolster for a vehicle according to (2), the distance between the second deformation portion and the second tip end portion may be set longer than a distance between the first deformation portion and the first tip end portion.

(4) In the knee bolster for a vehicle according to (1), the second deformation portion may be arranged such that a distance between the second deformation portion and the knee is shorter than the distance between the first deformation portion and the knee in the load application direction.

(5) In the knee bolster for a vehicle according to one of (1) to (4), the first bracket may differ from the second bracket in at least one of material, thickness, and cross sectional shape, whereby the first bracket may be formed to have a rigidity or a strength higher than that of the second bracket.

(6) In the knee bolster for a vehicle according to one of (1) to (5), the first support portion may be formed to have a U-shaped cross section with a bottom wall and a pair of side walls; the second support portion may be formed to have a U-shaped cross section with a bottom wall and a pair of side walls, the second support portion being formed wider than the first support portion; and the first bracket and the second bracket may be coupled with each other by coupling the pair of the side walls of the first support portion and the pair of the side walls of the second support portion.

Effects of the Invention

According to the structure as described in (1), the second load receiving portion of the second bracket is arranged closer to the knee than the first load receiving portion of the first bracket in the load application direction from the knee. Therefore, when the load applied from the knee is small (for example, in a low impact mode such as a mode in which the occupant wears a seat belt or the vehicle velocity is low at the time of the collision), the second load receiving portion receives the load whereby the second bracket is primarily deformed to absorb the impact. In addition, when the load applied from the knee is large (for example, in a high impact mode such as a mode in which the occupant does not wear a seat belt or the vehicle velocity is high at the time of the collision), the second load receiving portion receives the load whereby the second bracket is primarily deformed to absorb the impact, and thereafter, both of the second load receiving portion and the first load receiving portion receive the load whereby both of the second bracket and the first bracket are deformed to absorb the impact. Therefore, in a case where the applied load is small, the impact can be absorbed by the primal deformation of the second bracket, and in a case where the applied load is large, the impact can be absorbed by the deformations of the first bracket and the second bracket, before reaching the end of the deformation stroke. Accordingly, impact to the knee of the occupant can be preferably absorbed in accordance with the amount of the applied load.

According to the structure as described in (2), the second bracket is arranged such that, not only the second load receiving portion, but also the second tip end portion is arranged closer to the knee than the first bracket in the load application direction from the knee. Therefore, in a case where the load applied from the knee is small (that is, in the low impact mode), only the second bracket can be stably deformed.

According to the structure as described in (3), the distance between the second deformation portion and the second tip end portion is set longer than the distance between the first deformation portion and the first tip end portion. Therefore, in a case where a load applied from the knee is large (that is, in the high impact mode), the deformed second bracket can stably contact with the first bracket. Accordingly, the first bracket can stably absorb the impact, whereby a large impact can be absorbed before reaching the end of the deformation stroke.

According to the structure as described in (4), the second deformation portion of the second bracket is arranged closer to the knee than the first deformation portion of the first bracket in the load application direction from the knee. Therefore, in a case where a load applied from the knee is small (that is, in the low impact mode), only the second bracket can be stably deformed.

According to the structure as described in (5), the first bracket is formed to have a rigidity or a strength higher than that of the second bracket. Therefore, in a case where a load applied from the knee is small (that is, in the low impact mode), the second bracket can be stably deformed to absorb the impact, and in a case where a load applied from the knee is large (that is, in the high impact mode), it is possible to increase the impact absorption amount by the first bracket so as to absorb the impact before reaching the end of the deformation stroke. In addition, since the first support portion of the first bracket has a high rigidity to suppress the deformation of the first support portion, a preferable loading characterization can be achieved. Further, the interference to the vehicle body provided behind the first support portion can be suppressed so as to stabilize the applied load.

According to the structure as described in (6), the first bracket and the second bracket are coupled with each other by coupling the pair of the lateral side walls of the first support portion and the pair of the lateral side walls of the second support portion. Therefore, it is possible to prevent the first support portion and the second support portion from being outwardly deformed, whereby the deformation of the first support portion and the second support portion can be suppressed. Accordingly, the first deformation portion and the second deformation portion can be stably deformed so as to achieve the preferable loading characterization of the first bracket and the second bracket. Further, it is possible to suppress the interference to the vehicle body member provided behind the first support portion and the second support portion so as to stabilize the applied load.

DETAILED DESCRIPTION OF THE INVENTION

Hereinafter, a knee bolster 11 for a vehicle according to an embodiment of the present invention will be explained with reference to the attached drawings. In the following explanation, the terms indicating directions such as "up and down", "right and left", and "front and rear" mean each direction with respect to the vehicle, when the knee bolster 11 is mounted on the vehicle.

Figure 1:
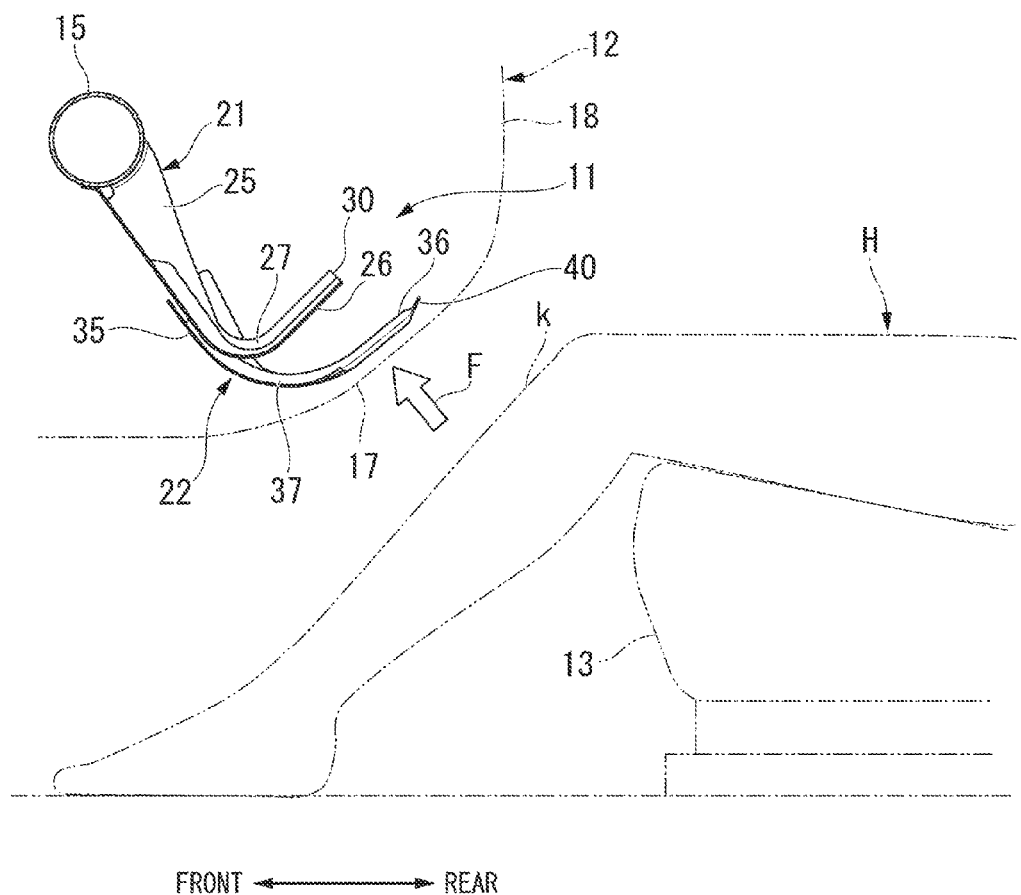
FIG. 1 is a side view of a front area of the vehicle interior including a knee bolster for a vehicle according to an embodiment of the present invention.

As illustrated in FIG. 1, the knee bolster 11 for the vehicle according to the present embodiment is arranged in an instrument panel 12 of the vehicle. The knee bolster 11 for the vehicle is adapted to be deformed by the load applied from the knee k of the occupant H who sits down on a seat 13, so as to protect the occupant H by absorbing the impact to the knee k.

The instrument panel 12 is fixed to a front pillar (not shown) of the vehicle body via a steering hanger beam 15 which is provided in the instrument panel 12. The steering hanger beam 15 is a vehicle body member used as a part of a frame of the vehicle body. The steering hanger beam 15 is a cylindrical steel pipe and connects the right and left front pillars along the width direction of the vehicle. Though it is not shown in figures, the steering hanger beam 15 supports a steering shaft and the like.

The instrument panel 12 includes a knee panel 17 which is arranged in front of the knee k of the occupant H and which extends obliquely upward and rearward, and a main panel 18 which substantially vertically extends from the knee panel 17. When the occupant H is in a normal sitting posture, the knee k of the occupant H extends obliquely downward and frontward. Accordingly, the load application direction F from the knee k of the occupant H to the instrument panel 12 at the time of the vehicle front collision is the obliquely upward and frontward direction. The knee panel 17 has a surface shape which intersects with the load application direction F at a substantially right angle. The knee bolster 11 for the vehicle according to this embodiment is supported by the steering hanger beam 15 and is arranged between the steering hanger beam 15 and the knee panel 17. This knee bolster 11 includes a first bracket 21 which is fixed to the steering hanger beam 15 and a second bracket 22 which is fixed to the first bracket 21.

The first bracket 21 is an integrally formed member which is press-formed from a piece of a steel sheet. The first bracket 21 includes a first support portion 25, a first load receiving portion 26, and a first deformation portion 27. The first support portion 25 is supported by the steering hanger beam 15 and extends obliquely downward and rearward to the knee panel 17. The first load receiving portion 26 extends obliquely upward and rearward from the extended tip end of the first support portion 25 along the knee panel 17. The first deformation portion 27 is provided between the first support portion 25 and the first load receiving portion 26 and has a curved shape which can be easily deformed.

In this structure, since the knee k of the occupant H is disposed at a position apart from the knee panel 17 in the downward and rearward direction, the first support portion 25 extends from the steering hanger beam 15 to the knee k. In addition, since the knee panel 17 extends along the direction which intersects with the load application direction F at a substantially right angle as mentioned above, the first load receiving portion 26 also extends along the direction as same as that of the knee panel.

The first support portion 25, the first deformation portion 27, and the first load receiving portion 26 are continuously formed, and the first bracket 21 has a substantially V shape as a whole when viewed from a side view. In the first bracket 21, the first load receiving portion 26 receives the load applied in the load application direction F from the knee k at the time of the vehicle front collision, and the first deformation portion 27, which primarily receives the load, is plastically deformed so as to absorb the impact.

Figure 2:
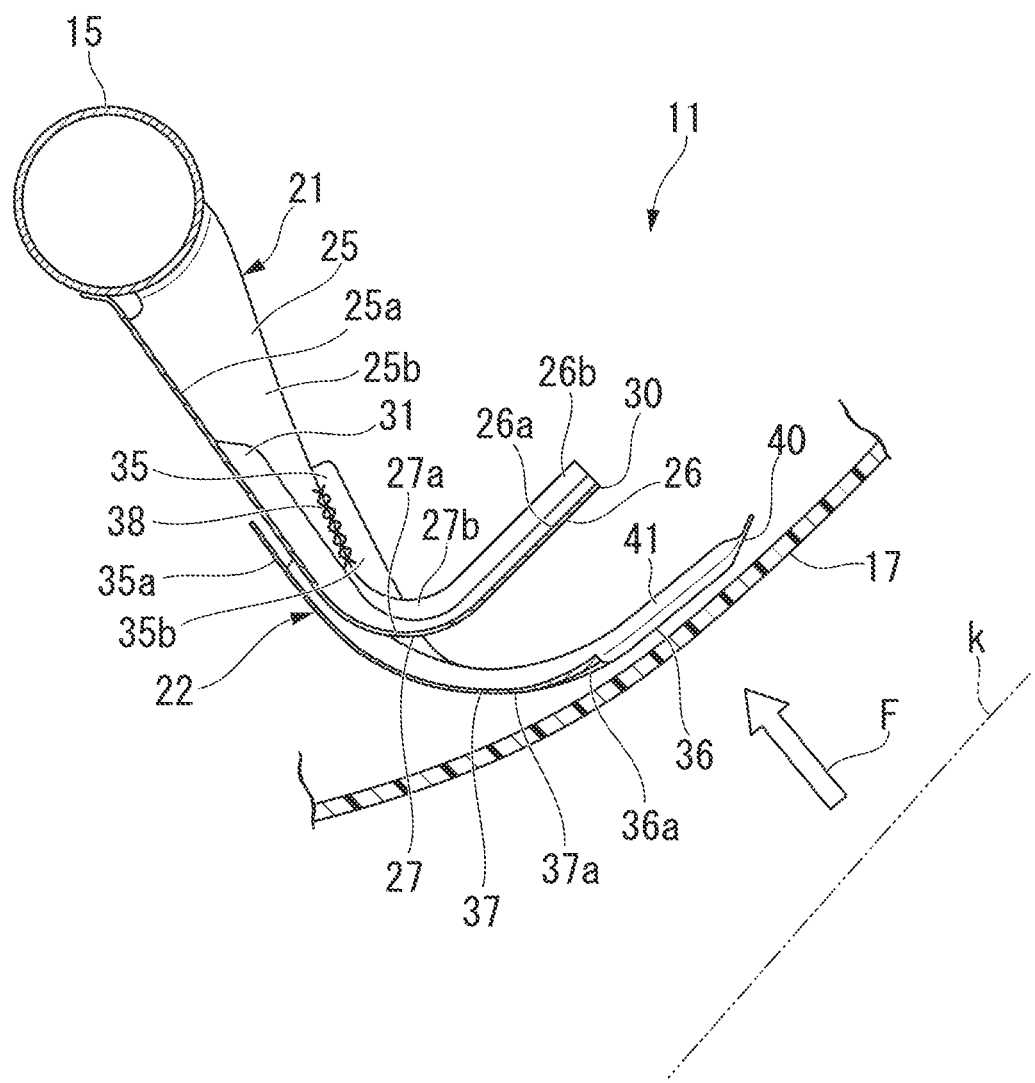
FIG. 2 is a side view of the knee bolster for the vehicle according to the embodiment of the present invention.
Figure 3:
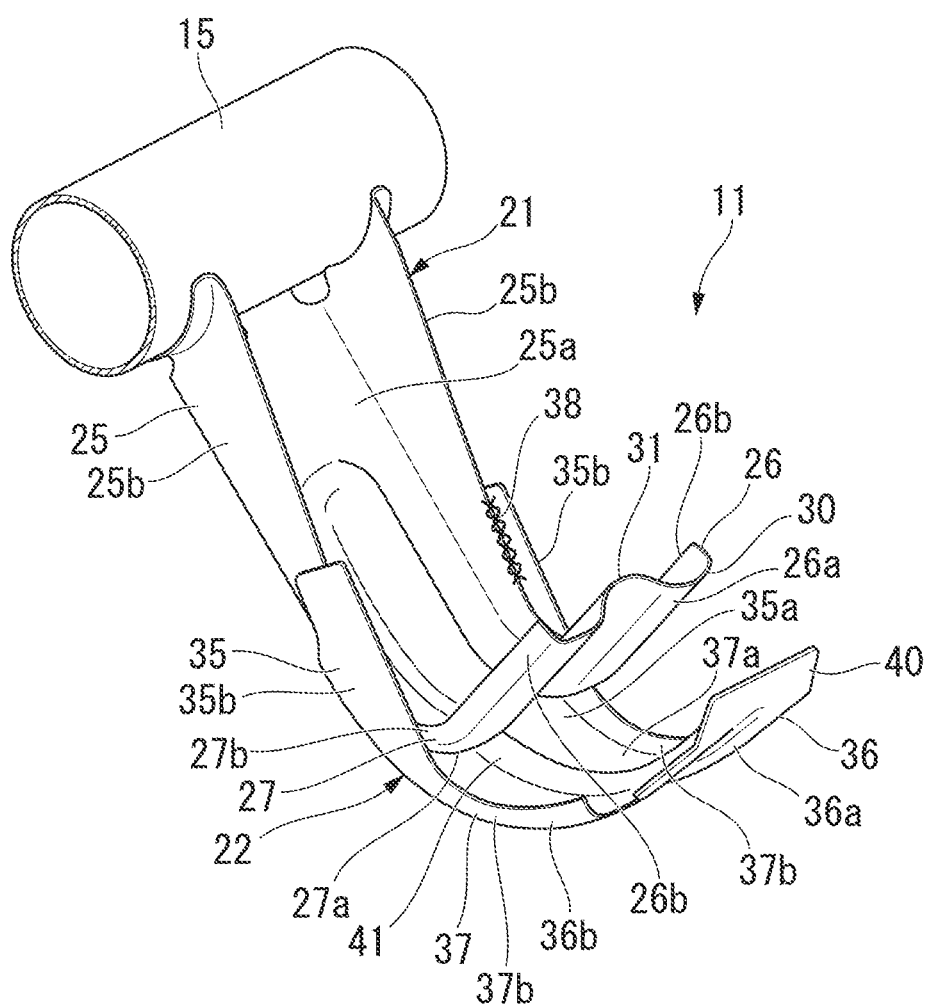
FIG. 3 is a perspective view of the knee bolster for the vehicle according to the embodiment of the present invention.

As illustrated in FIG. 2 and FIG. 3, the first support portion 25 has a U-shaped cross section formed by a bottom wall 25a and a pair of side walls 25b. The bottom wall 25a is fixed to the lower portion of the steering hanger beam 15 along the width direction of the vehicle by welding or the like, and extends obliquely downward and rearward. The pair of the side walls 25b vertically extends from the lateral ends of the bottom wall 25a and is fixed to the rear portion of the steering hanger beam 15, by welding or the like. The pair of the side walls 25b has a shape in which the height from the bottom wall 25a gradually decreases as the distance from the steering hanger beam 15 increases.

The first deformation portion 27 has a bottom wall 27a and a pair of side walls 27b. The bottom wall 27a is continuously formed with the bottom wall 25a of the first support portion 25 and extends rearward. Further, the bottom wall 27a has an arc-shape with a center point at the upper side thereof. The pair of the side walls 27b is continuously formed with the pair of the side walls 25b of the first support portion 25 and vertically extends from the bottom wall 27a with a substantially constant height.

The first load receiving portion 26 includes a bottom wall 26a and a pair of side walls 26b. The bottom wall 26a is continuously formed with the bottom wall 27a of the first deformation portion 27 and extends obliquely upward and rearward. The pair of the side walls 26b is continuously formed with the pair of the side walls 27b of the first deformation portion 27 and vertically extends from the bottom wall 26a with a substantially constant height.

In the first bracket 21, as illustrated in FIG. 3, a bead 31 is formed on the lateral center portion of the bottom walls 25a, 27a, and 26a, through a middle portion of the first support portion 25, the first deformation portion 27, and a first tip end portion 30 which is opposed to the first deformation portion 27 with respect to the first load receiving portion 26. This bead 31 upwardly projects from the bottom walls 25a, 27a, and 26a. That is, the respective upper surface of the bottom walls 25a, 27a, and 26a has a convex shape and the respective lower surface of the bottom walls 25a, 27a, and 26a has a concave shape.

The second bracket 22 is also an integrally formed member which is press-formed from a piece of a steel sheet. As illustrated in FIG. 2, the second bracket 22 is arranged at the lower side of the first bracket 21 so as to be supported by the first support portion 25. The second bracket 22 includes a second support portion 35, a second load receiving portion 36, and a second deformation portion 37. The second support portion 35 is supported by the first bracket and extends obliquely downward and rearward along the first support portion 25 of the first bracket 21. The second load receiving portion 36 extends obliquely upward and rearward from the extended tip end of the second support portion 35, along the first load receiving portion 26 (that is, along the knee panel 17) at a position closer to the knee panel 17 than the first load receiving portion 26 of the first bracket 21. The second deformation portion 37 is disposed between the second support portion 35 and the second load receiving portion 36, and has a curved surface shape which is easily deformed.

The second support portion 35, the second deformation portion 37, and the second load receiving portion 36 are continuously formed, and the second bracket 22 also has a substantially V shape as a whole when viewed from a side view. In this second bracket 22, the second load receiving portion 36 receives the load applied from the knee k in the load application direction F when the vehicle front collision occurs, and the second deformation portion 37 is plastically deformed primarily by the applied load so as to absorb the impact.

The second support portion 35 is formed to have a U-shaped cross section including a bottom wall 35a and a pair of side walls 35b. The bottom wall 35a is arranged along the lower side of the bottom wall 25a of the first support portion 25. The pair of the side walls 35b vertically extends from the lateral ends of the bottom wall 35a, and is fixed to the pair of the side walls 25b of the first support portion 25.

Since the bottom wall 35a is arranged along the bottom wall 25a, the bottom wall 35a is arranged along the width direction of the vehicle and extends obliquely downward and rearward. The distance between the pair of the side walls 35b of the second support portion 35 is wider than the distance between the pair of the side walls 25b of the first support portion 25. Thus, the second support portion 35 is wider than the first support portion 25. The pair of the side walls 35b also has a shape wherein the height from the bottom wall 35a decreases as the distance from the steering hanger beam 15 increases.

The second bracket 22 is arranged such that the pair of the side walls 35b of the second support portion 35 is in contact with the both external lateral sides of the pair of the side walls 25b of the first support portion 25 of the first bracket 21. Then, in this state, the upper edges of the pair of the side walls 25b of the first support portion 25 are welded to the inside surface of the pair of the side walls 35b of the second support portion 35, by MIG welding (Metal Insert Gas welding) or the like. As a result, between the upper edge of the side wall 25b of the first support portion 25 and the side wall 35b of the second support portion 35, a welded portion 38 is formed to join them. Accordingly, the first bracket 21 and the second bracket 22 are coupled with each other by joining the side walls 25b and the side walls 35b at the respective lateral ends of the first support portion 25 and the second support portion 35.

The second deformation portion 37 includes, as illustrated in FIG. 3, a bottom wall 37a and a pair of side walls 37b. The bottom wall 37a is continuously formed with the bottom wall 35a of the second support portion 35 and extends obliquely rearward. Further, the bottom wall 37a has an arc-shape with a center point at the upper side thereof. The pair of the side walls 37b is continuously formed with the pair of the side walls 35b of the second support portion 35 and vertically extends from the bottom wall 37a with a substantially constant height.

The second load receiving portion 36 includes a bottom wall 36a and a pair of side walls 36b. The bottom wall 36a is continuously formed with the bottom wall 37a of the second deformation portion 37 and extends obliquely upward and rearward. The pair of the side walls 36b is continuously formed with the pair of the side walls 37b of the second deformation portion 37 and vertically extends from the bottom wall 36a with a substantially constant height.

The bottom wall 36a has a shape in which the width gradually narrows as the distance from the second deformation portion 37 increases, and extends to the rear direction farther than the pair of the side walls 36b. This extended tip end is provided with a second tip end portion 40 which is bent or curved and extends obliquely upward from the bottom wall 36a. That is, the second bracket 22 includes the second tip end portion 40 at the opposed side of the second deformation portion 37 with respect to the second load receiving portion 36.

Figure 4:
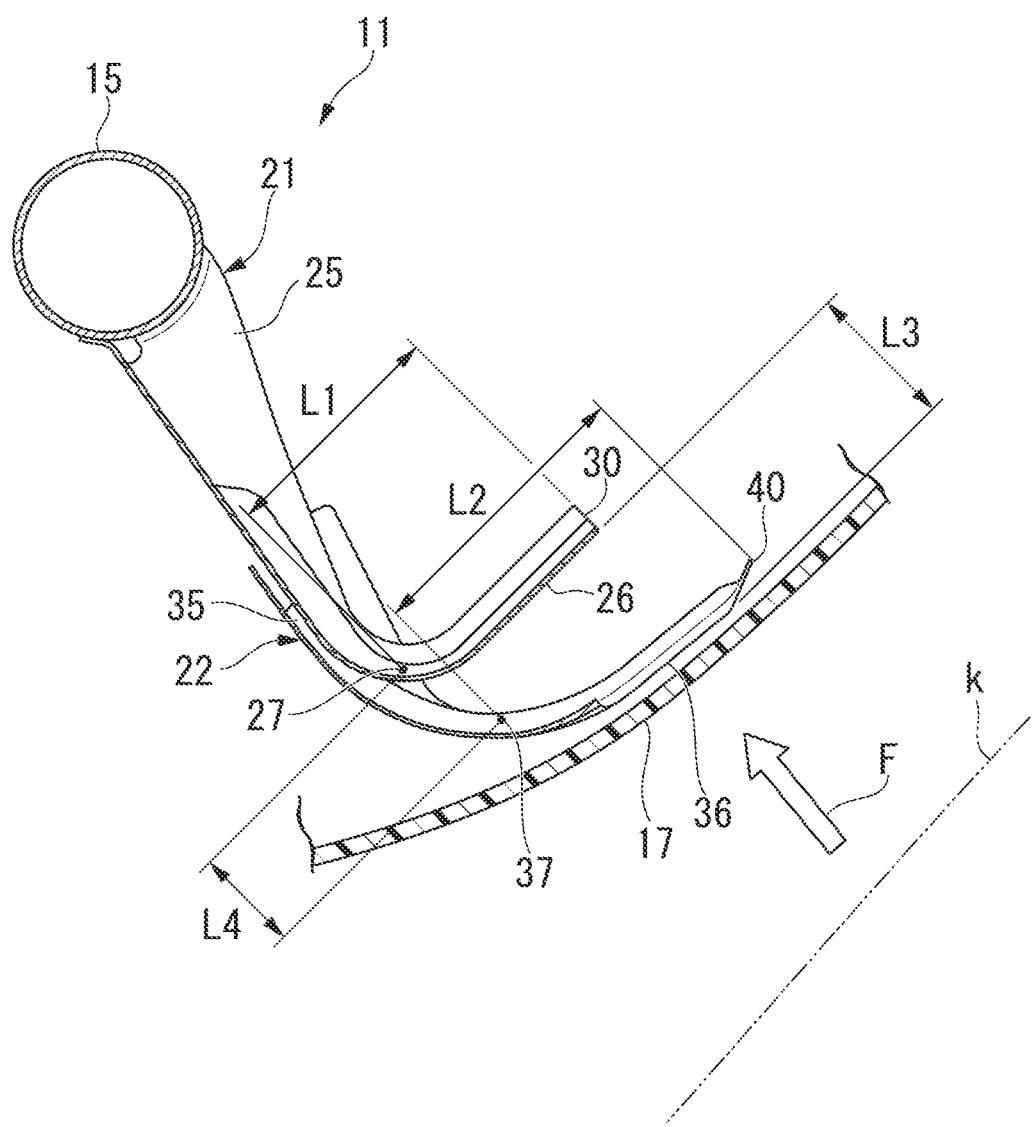
FIG. 4 is a side view of the knee bolster for the vehicle according to the embodiment of the present invention, indicating dimensional relationships.

Meanwhile, as illustrated in FIG. 4, the distance L2 between the second deformation portion 37 (specifically, the center of the deformed portion) and the second tip end portion 40 (specifically, the tip end thereof) of the second bracket 22 is set longer than the distance L1 between the first deformation portion 27 (specifically, the center of the deformed portion) and the first tip end portion 30 (specifically, the tip end thereof) of the first bracket 21.

Then, as illustrated in FIG. 2 and FIG. 3, the second bracket 22 is also formed with a bead 41 on the lateral center portion of the bottom walls 35a, 37a, and 36a through the second support portion 35, the second deformation portion 37, and a middle of the second tip end portion 40 of the second load receiving portion 36. This bead 41 upwardly projects from the bottom walls 35a, 37a, and 36a. That is, the respective upper surface of the bottom walls 35a, 37a, and 36a has a convex shape and the respective lower surface of the bottom walls 35a, 37a, and 36a has a concave shape. The bead 41 of the second bracket 22 has a cross section smaller than that of the bead portion 31 of the first bracket 21, and is arranged so as to be covered by the bead portion 31.

Meanwhile, in the first bracket 21, the first load receiving portion 26 has a free end so as not to continue to a portion other than the first deformation portion 27. Further, in the second bracket 22, the second load receiving portion 36 has a free end so as not to continue to a portion other than the second deformation portion 37. Furthermore, the bottom walls 35a, 37a, and 36a of the second bracket 22 are not in contact with the bottom walls 25a, 27a, and 26a of the first bracket 21 and are apart therefrom.

According to the above structure, the second bracket 22 is arranged such that the second load receiving portion 36 is apart from the first load receiving portion 26 of the first bracket 21 by the predetermined distance in the load application direction F, at the side close to the knee k. That is, the distance between the second load receiving portion 36 and the knee k is shorter than the distance between the first load receiving portion 26 and the knee k by the predetermined distance, in the load application direction F. Further, the second tip end portion 40 of the second bracket 22 is apart from the first tip end portion 30 of the first bracket 21 by the predetermined distance L3 in the load application direction F, at the side close to the knee k. That is, the distance between the second tip end portion 40 and the knee k is shorter than the distance between the first tip end portion 30 and the knee k by the predetermined distance L3 in the load application direction F. Furthermore, the second deformation portion 37 (specifically, the center of the deformed portion) of the second bracket 22 is arranged apart from the first deformation portion 27 (specifically, the center of the deformed portion) of the first bracket 21 by the predetermined distance L4 in the load application direction F, at the side close to the knee k. That is, the distance between the second deformation portion 37 and the knee k is shorter than the distance between the first deformation portion 27 and the knee k by the predetermined distance L4 in the load application direction F.

In other words, the second bracket 22 is arranged such that the second load receiving portion 36 is apart from the first load receiving portion 26 of the first bracket 21 by a predetermined distance in the perpendicular direction to the direction along the knee panel 17, at the side close to the knee panel 17. Further, the second tip end portion 40 of the second bracket 22 is arranged apart from the first tip end portion 30 of the first bracket 21 by a predetermined distance L3 in the perpendicular direction to the direction along the knee panel 17, at the side close to the knee panel 17. Furthermore, the second deformation portion 37 of the second bracket 22 is arranged apart from the first deformation portion 27 of the first bracket 21 by a predetermined distance L4 in the perpendicular direction to the direction along the knee panel 17, at the side close to the knee panel 17.

The first bracket 21 differs from the second bracket 22 in at least one of material, thickness, and cross sectional shape, whereby the first bracket 21 is formed to have a rigidity or a strength higher than that of the second bracket 22. More specifically, the material of the first bracket 21 may have a rigidity and a strength higher than that of the material of the second bracket 22, and the first bracket 21 may have a bead 31 with a cross section larger than that of the bead 41 of the second bracket 22. In this case, the first bracket 21 can be made to have a cross section which can exert high rigidity and high strength when compared with the second bracket 22.

Figure 5A:
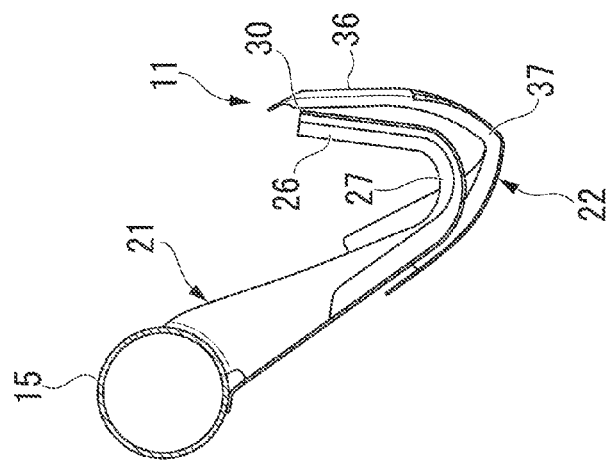
FIG. 5A is a side view of the knee bolster for the vehicle before the deformation.
Figure 5B:
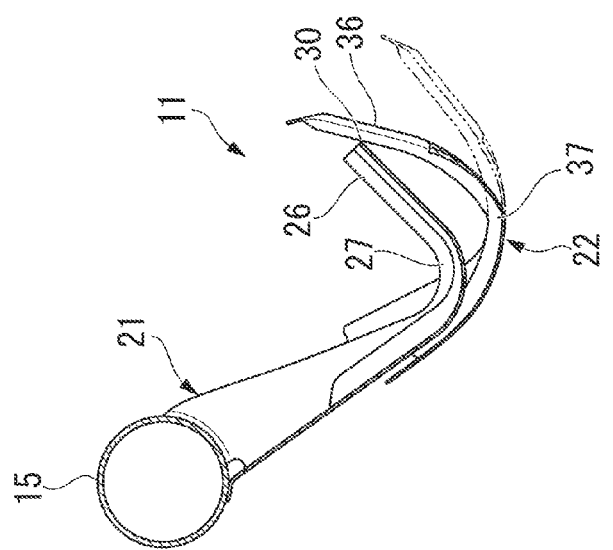
FIG. 5B is the side view of the knee bolster for the vehicle at the early stage of the deformation.
Figure 5C:
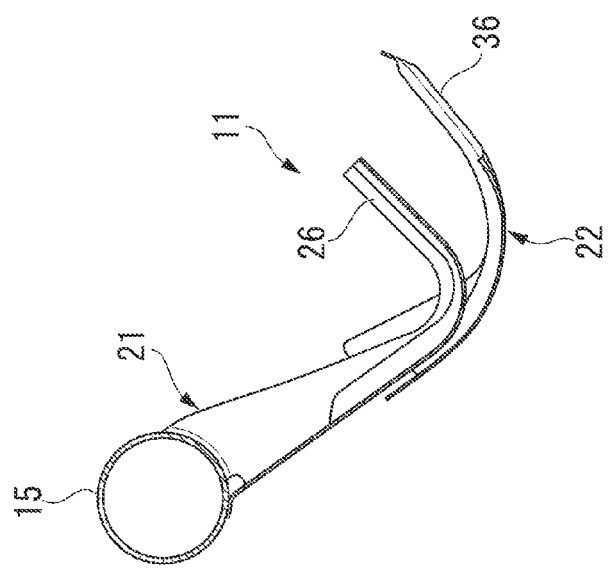
FIG. 5C is the side view of the knee bolster for the vehicle at the late stage of the deformation.
Figure 6:
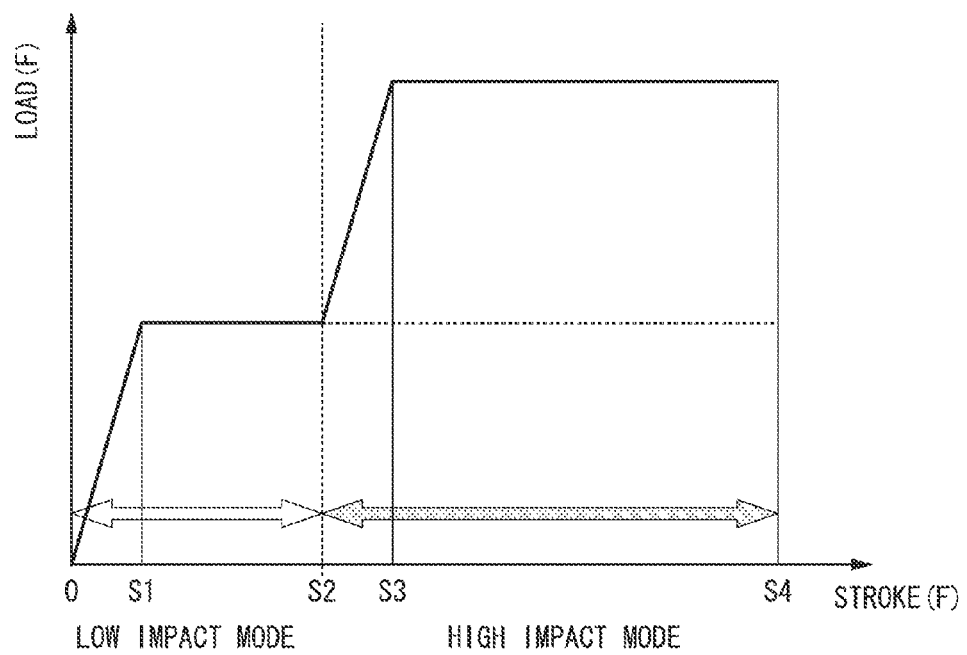
FIG. 6 is a diagrammatic view indicating a relationship between the applied load (vertical axis) and the deformation stroke (horizontal axis) of the knee bolster for the vehicle according to the embodiment of the present invention.

According to the above mentioned knee bolster 11 for the vehicle, the second load receiving portion 36 of the second bracket 22 is arranged closer to the knee k in the load application direction F from the knee k when the front collision occurs, than the first load receiving portion 26 of the first bracket 21. Accordingly, when the load applied from the knee k is small (for example, in a low impact mode such as a mode in which the occupant wears a seat belt or the vehicle velocity is low at the time of the collision), as illustrated in FIG. 5A and FIG. 5B, the load applied to the knee k through the knee panel 17 is received by the second load receiving portion 36, whereby only the second bracket 22 is easily deformed primarily at the second deformation portion 37 to absorb the impact. That is, as indicated through strokes 0, S1, and S2 in FIG. 6, when the applied load is small, the plastic deformation of the second bracket 22 primarily starts at the stroke S1, and receives a low load until reaching the stroke S2 while being plastically deformed to absorb the impact.

On the other hand, when the load applied from the knee k is large (for example, in a high impact mode such as a mode in which the occupant does not wear a seat belt or the vehicle velocity is high at the time of the collision), as illustrated in FIG. 5A and FIG. 5B, the load applied from the knee k through the knee panel 17 is received by the second load receiving portion 36, whereby only the second bracket 22 is deformed primarily at the second deformation portion 37. Thereafter, the second load receiving portion 36 of the second bracket 22 contacts with the first tip end portion 30 of the first load receiving portion 26 of the first bracket 21. As a result, the load is received by both of the second load receiving portion 36 and the first load receiving portion 26, whereby the impact force can be absorbed by the deformation of the second deformation portion 37 and the first deformation portion 27. That is, as indicated through strokes S2, S3, and S4 in FIG.

6, after the second bracket 22 contacts with the first bracket 21 at the stroke S2, the plastic deformation of the first bracket 21 starts due to a large load at the stroke S3, and then absorbing the impact by the plastic deformations of the second bracket 22 and the first bracket 21, at the stroke S4.

Accordingly, in a case where the applied load is small, the impact can be absorbed by the deformation which easily occurs, and in a case where the applied load is large, the impact can be also absorbed before reaching the end of the deformation stroke. Therefore, in accordance with the amount of the applied load, impact to the knee k of the occupant H can be preferably absorbed.

Further, the second bracket 22 is arranged such that not only the second load receiving portion 36, but also the second tip end portion 40 is closer to the knee k in the load application direction F from the knee k than the first bracket 21. Accordingly, when the load applied from the knee k is small (that is, in the low impact mode), only the second bracket 22 can be stably deformed.

In addition, the distance between the second deformation portion and the second tip end portion is longer than the distance between the first deformation portion 27 and the first tip end portion 30. Therefore, in a case where the load applied from the knee k is large (that is, in the high impact mode), the deformed second bracket 22 can be made in contact with the first bracket 21 stably. Thus, since it is possible to stably absorb the impact force, a large impact can be absorbed before reaching the end of the deformation stroke (that is, a two-stage load can be stably received).

In addition, the second deformation portion 37 of the second bracket 22 is arranged closer to the knee k in the load application direction F from the knee k than the first deformation portion 27 of the first bracket 21. Accordingly, when the load applied from the knee k is small (that is, in the low impact mode), only the second bracket 22 can be stably deformed. In addition, since only the second tip end portion 40 can be stably in contact with the first bracket 21, a two-stage load can be received.

In addition, the first bracket 21 is formed to have a rigidity or a strength higher than that of the second bracket 22. Therefore, the impact absorption can be achieved in two cases, that is, (1) when the load applied from the knee k is small (that is, in the low impact mode), the second bracket 22 can be stably deformed so as to absorb the impact force, and (2) when the load applied from the knee k is large (that is, in the high impact mode), the impact absorption amount by the first bracket is increased so as to absorb the impact before reaching the end of the deformation stroke. In addition, since the first support portion 25 of the first bracket has high rigidity, the deformation of the first support portion 25 can be suppressed, whereby the preferable loading characterization can be achieved. Further, the interference to the steering hanger beam 15 arranged behind the first support portion 25 can be suppressed so as to stabilize the applied load.

In addition, the first bracket 21 and the second bracket 22 are coupled with each other by joining the first support portion 25 and the second support portion 35 at the right and left sides of the pair of the side walls 25b and 35b. Therefore, it is possible to suppress the outward deformation of the first support portion 25 and the second support portion 35 of the first bracket 21 which form a U-shaped cross section, and suppress the deformation of the first support portion 25 and the second support portion 35. Accordingly, the first deformation portion 27 and the second deformation portion 37 can be stably deformed so as to stabilize the applied load.

Note that in the above embodiment, the second bracket 22 is supported by the first bracket 21. However, the present invention is not limited thereto. For example, the second bracket 22 can be supported by the steering hanger beam 15. Further, the second bracket 22 can be supported by both of the first bracket 21 and the steering hanger beam 15.

While preferred an embodiment of the invention has been described and illustrated above, it should be understood that it is an exemplary of the invention and is not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A knee bolster for a vehicle, the knee bolster being adapted to be deformed when a load is applied from a knee of an occupant in a load application direction so as to absorb an impact to the knee, the knee bolster comprising,
   a first bracket which includes:
      a first support portion which is supported by a vehicle body member and extends toward the knee;
      a first load receiving portion which extends from an extended tip end of the first support portion in a direction which crosses the load application direction; and
      a first deformation portion which is arranged between the first support portion and the first load receiving portion, and is adapted to be deformed when the load is applied, and
   a second bracket which includes:
      a second support portion which is supported by the vehicle body member or the first bracket and extends along the first support portion;
      a second load receiving portion which extends along the first load receiving portion; and
      a second deformation portion which is arranged between the second support portion and the second load receiving portion, and is adapted to be deformed when the load is applied; wherein
      the second bracket is arranged such that a distance between the second load receiving portion and the knee is shorter than a distance between the first load receiving portion and the knee, in the load application direction,
   wherein:
      the first bracket includes a first tip end portion at an opposite side of the first deformation portion with respect to the first load receiving portion; and
      the second bracket includes a second tip end portion at an opposite side of the second deformation portion with respect to the second load receiving portion, and wherein
      the second tip end portion is arranged such that a distance between the second tip end portion and the knee is shorter than a distance between the first tip end portion and the knee, in the load application direction.

2. The knee bolster for a vehicle according to claim 1, wherein
   a distance between the second deformation portion and the second tip end portion is set longer than a distance between the first deformation portion and the first tip end portion.

3. The knee bolster for a vehicle according to claim 2, wherein:
   the first support portion is formed to have a U-shaped cross section with a bottom wall and a pair of side walls;

the second support portion is formed to have a U-shaped cross section with a bottom wall and a pair of side walls, the second support portion being formed wider than the first support portion; and the first bracket and the second bracket are coupled with each other by coupling the pair of the side walls of the first support portion and the pair of the side walls of the second support portion.

4. The knee bolster for a vehicle according to claim 1, wherein the second deformation portion is arranged such that a distance between the second deformation portion and the knee is shorter than a distance between the first deformation portion and the knee in the load application direction.

5. The knee bolster for a vehicle according to claim 4, wherein:

the first support portion is formed to have a U-shaped cross section with a bottom wall and a pair of side walls;

the second support portion is formed to have a U-shaped cross section with a bottom wall and a pair of side walls, the second support portion being formed wider than the first support portion; and the first bracket and the second bracket are coupled with each other by coupling the pair of the side walls of the first support portion and the pair of the side walls of the second support portion.

6. The knee bolster for a vehicle according to claim 1, wherein the first bracket differs from the second bracket in at least one of material, thickness, and cross sectional shape, whereby the first bracket is formed to have a rigidity or a strength higher than that of the second bracket.

7. The knee bolster for a vehicle according to claim 6, wherein:

the first support portion is formed to have a U-shaped cross section with a bottom wall and a pair of side walls;

the second support portion is formed to have a U-shaped cross section with a bottom wall and a pair of side walls, the second support portion being formed wider than the first support portion; and the first bracket and the second bracket are coupled with each other by coupling the pair of the side walls of the first support portion and the pair of the side walls of the second support portion.

8. The knee bolster for a vehicle according to claim 1, wherein:

the first support portion is formed to have a U-shaped cross section with a bottom wall and a pair of side walls;

the second support portion is formed to have a U-shaped cross section with a bottom wall and a pair of side walls, the second support portion being formed wider than the first support portion; and the first bracket and the second bracket are coupled with each other by coupling the pair of the side walls of the first support portion and the pair of the side walls of the second support portion.

* * * * *